US012470511B2

(12) United States Patent
Li

(10) Patent No.: US 12,470,511 B2
(45) Date of Patent: Nov. 11, 2025

(54) SYSTEMS AND METHODS FOR PROCESSING MULTIPLE IP PACKET TYPES IN A NETWORK ENVIRONMENT

(71) Applicant: Fortinet, Inc., Sunnyvale, CA (US)

(72) Inventor: Hongwei Li, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 514 days.

(21) Appl. No.: 17/492,456

(22) Filed: Oct. 1, 2021

(65) Prior Publication Data

US 2023/0105602 A1    Apr. 6, 2023

(51) Int. Cl.
*H04L 61/2503*    (2022.01)
*H04L 5/00*    (2006.01)
*H04L 9/40*    (2022.01)
*H04L 45/74*    (2022.01)
*H04L 49/25*    (2022.01)
*H04L 101/618*    (2022.01)

(52) U.S. Cl.
CPC ........ *H04L 61/2503* (2013.01); *H04L 5/0044* (2013.01); *H04L 45/74* (2013.01); *H04L 49/25* (2013.01); *H04L 63/02* (2013.01); *H04L 2101/618* (2022.05)

(58) Field of Classification Search
None
See application file for complete search history.

(56) References Cited

U.S. PATENT DOCUMENTS

| 8,625,594 | B2* | 1/2014 | Safrai | H04L 12/18 370/392 |
| 8,861,525 | B1* | 10/2014 | Durand | H04L 61/2557 370/401 |
| 2007/0022479 | A1* | 1/2007 | Sikdar | H04L 63/0218 726/25 |
| 2009/0245278 | A1* | 10/2009 | Kee | H04L 61/251 370/467 |
| 2009/0268668 | A1* | 10/2009 | Tinnakornsrisuphap | H04L 61/103 370/328 |
| 2009/0316684 | A1* | 12/2009 | Buckley | H04L 61/2503 370/352 |
| 2014/0250240 | A1* | 9/2014 | Schell | H04L 61/2535 709/245 |

FOREIGN PATENT DOCUMENTS

CN    101800740 A    *    8/2010

* cited by examiner

*Primary Examiner* — Lance Leonard Barry
(74) *Attorney, Agent, or Firm* — Jaffery Watson Hamilton & DeSanctis LLP

(57) ABSTRACT

Systems, devices, and methods include receiving, at a first physical port of a network appliance, an IP type A packet. The IP type A packet includes a packet header and a packet payload, and the packet header includes an IP type A destination address. The methods further include determining that the IP type A packet is destined for an IP type B address space; routing the IP type A packet to a virtual port; receiving, the IP type A packet by the virtual port; based at least in part on being received by the virtual port, converting the IP type A address to an IP type B address; and formatting an IP type B packet including an IP type B header and the packet payload from the IP type A packet, wherein the IP type B header includes the IP type B address.

20 Claims, 4 Drawing Sheets

SYSTEMS AND METHODS FOR PROCESSING MULTIPLE IP PACKET TYPES IN A NETWORK ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to processing different types of packets in a network environment, and more particularly to systems and methods for receiving a first packet type and outputting a second packet type based upon knowledge of a source device and a recipient device.

BACKGROUND

Network devices can be used to connect a number of endpoint devices and/or applications. Communications from one endpoint device and/or application may be received on one physical port of a particular network device and re-transmitted to another endpoint device and/or application via another physical port on the particular network device. This process works well where the communications being transmitted are of the same format, however, as networks continue to evolve, formats are also evolving. This has impacted the interoperability of networks.

Thus, there exists a need in the art for more advanced approaches, devices, and systems for enhancing network interoperability.

SUMMARY

Various embodiments provide systems and methods for receiving a first packet type and outputting a second packet type based upon knowledge of a source device and a recipient device.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
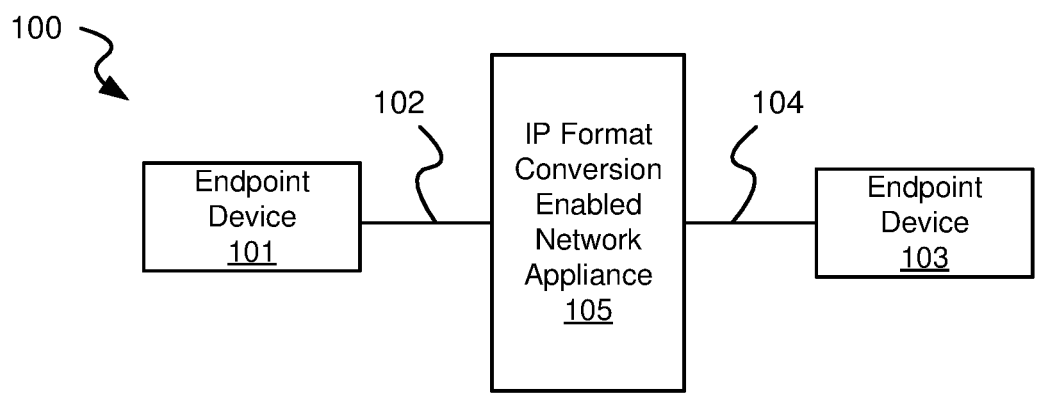
FIGS. 1A-1C illustrate a network architecture including a IP format conversion enabled network appliance in accordance with some embodiments.

Various embodiments provide systems and methods for receiving a first packet type and outputting a second packet type based upon knowledge of a source device and a recipient device.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "IPv4" is short for Internet protocol version 4. As is known in the art, IPv4 uses a 32-bit address scheme. The phrase "IPv6" is short for Internet protocol version 6. As is known in the art, IPv8 uses a 128-bit address scheme.

Example embodiments will now be described more fully hereinafter with reference to the accompanying drawings, in which example embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for supporting multiple Internet Protocol (IP) types. Such methods include: receiving, at a first physical port, an IP type A packet. The IP type A packet includes a packet header and a packet payload, and the packet header includes and IP type A destination address. The methods further include: determining, by a processing resource, that the IP type A packet is destined for an IP type B address space; routing, by the processing resource, the IP type A packet to a virtual port; receiving, the IP type A packet by the virtual port; based at least in part on being received by the virtual port, converting the IP type A address to an IP type B address by the processing resource; and formatting an IP type B packet including an IP type B header and the packet payload from the IP type A packet, wherein the IP type B header includes the IP type B address.

In some instances of the aforementioned embodiments, the methods further include routing, by the processing resource, the IP type B packet to a second physical port. In some cases, the first physical port, the second physical port, the virtual port, and the processing resource are part of the same network appliance. In particular cases, the network appliance is a network firewall.

In various instances of the aforementioned embodiments, the IP type A packet is one or the other of an IPv4 packet, or an IPv6 packet. In some such instances, the IP type B packet is the other of the IPv4 packet, or the IPv6 packet. In some instances of the aforementioned embodiments, the first physical port is an Ethernet port. In various instances, the second physical port is an Ethernet port.

Other embodiments provide systems for processing Internet Protocol (IP) packets. Such systems include: a first physical port, a second physical port, a processing resource, and a non-transitory computer-readable medium coupled to the processing resource. The non-transitory computer-readable medium has stored therein instructions that when executed by the processing resource cause the processing resource to: provision a virtual port to convert IP packets; receive an IP type A packet at the first physical port, where the IP type A packet includes a packet header and a packet payload, and the packet header includes and IP type A destination address; determine that the IP type A address is destined for an IP type B address space; route the IP type A packet to the virtual port; receive the IP type A packet by the virtual port; based at least in part on being received by the virtual port, convert the IP type A address to an IP type B address by the processing resource; and format an IP type B packet including an IP type B header and the packet payload from the IP type A packet, wherein the IP type B header includes the IP type B address.

Yet other embodiments provide non-transitory computer-readable storage media embodying a set of instructions, which when executed by a processing resource, causes the processing resource to: provision a virtual port to convert IP packets; receive an IP type A packet at the first physical port, where the IP type A packet includes a packet header and a packet payload, and where the packet header includes and IP type A destination address; determine that the IP type A address is destined for an IP type B address space; route the IP type A packet to the virtual port; receive the IP type A packet by the virtual port; based at least in part on being received by the virtual port, convert the IP type A address to an IP type B address by the processing resource; and format an IP type B packet including an IP type B header and the packet payload from the IP type A packet, wherein the IP type B header includes the IP type B address.

Turning to FIG. 1A, network architecture 100 is shown in accordance with some embodiments. In the context of network architecture 100, an IP format conversion enabled network appliance 105 provides communications between two endpoint devices 101, 103. In particular, communications between IP format conversion enabled network appliance 105 and endpoint device 101 are performed over a network communication link 102, and communications between IP format conversion enabled network appliance 105 and endpoint device 103 are performed over a network communication link 104. While only one IP format conversion enabled network appliance 105 and two endpoint devices 101, 103 are shown, it is to be understood that network architecture 100 may include a large number of endpoint devices, and one or more IP format conversion enabled network appliances, and/or other network applications and network appliances.

Network communication links 102, 104 may be part of any type of communication network known in the art. Those skilled in the art will appreciate that, the network including network communication links 102, 104 can be a wireless network, a wired network, or a combination thereof that can be implemented as, but are not limited to, one of the various types of networks, such as an Intranet, a Local Area Network (LAN), a Wide Area Network (WAN), an Internet, and/or one or more combinations of the aforementioned, Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Endpoint devices 101, 103 may be any processor based device that is capable of performing one or more processes including sending and receiving communications from other endpoint devices and/or applications via IP format conversion enabled network appliance 105. Based upon the disclosure provided herein, one of ordinary skill in the art will recognize a variety of endpoint devices that may be used in relation to different embodiments.

Figure 1B:
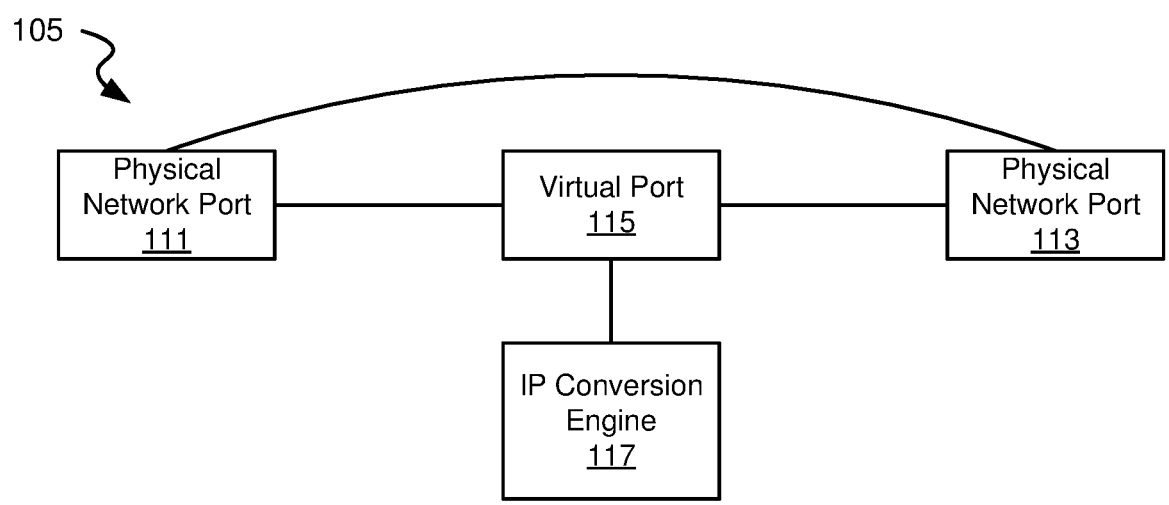

Turning to FIG. 1B, a block diagram of IP format conversion enabled network appliance 105 is shown in accordance with some embodiments. As shown, IP format conversion enabled network appliance 105 includes a physical network port 111, a physical network port 113, and a virtual port 115 connected to both physical network port 111 and physical network port 113. An IP conversion engine 117 is accessible via virtual port 115.

In operation, an IP packet is received at physical network port 111. It is determined whether an IPv4 packet has been received at physical network port 111 and that the received IP packet is destined for an IPv4 address space. Where this is the case, no address conversion is required, and thus the received IPv4 packet is provided to physical network port 113 without any conversion. In turn, the received IPv4 packet is transmitted out via physical port 113.

Alternatively, where it is determined that the received IPv4 packet is destined for an IPv6 address space, an address conversion is needed. In this case, the physical network port 111 transfers the received IPv4 packet to virtual port 115. Virtual port 115 receives the IPv4 packet and provides it to IP conversion engine 117. IP conversion engine 117 converts the destination address from the received IPv4 address space to the IPv6 address space. Such a conversion may be done using any conversion process known in the art. As an example such a conversion may be done using a pre-programmed look-up table. As another example, such a conversion may be done using a conversion algorithm. Based upon the disclosure provided herein, one of ordinary skill in the art will recognize a variety of approaches that may be used to perform the conversion.

In addition, IP conversion engine 117 reformats the IPv4 packet header to emulate an IPv6 packet header. This includes replacing the IPv4 destination address in the header with the converted IPv6 address yielded from the previously discussed conversion process. The following pseudocode represents the processes of receiving an IPv4 packet and outputting a corresponding IPv6 packet where internal is physical network port 111, wan is physical network port 113, and root.naf is virtual port 115.

```
IPv4_rev( ):
    A4->V46 RX @ internal      /* receive IPv4 packet at port 111
    A4->V46 TX @root.naf       /* transfer received IPv4 packet to
    virtual port 115
IPv6_rev( ):
    S6->T6 RX @root.naf        /* receive converted IPv6 packet
    (former IPv4 packet) at the virtual port 115
    S6->T6 TX @wan             /* transmit converted IPv6 packet
    port 113
```

Alternatively, where an IPv6 packet is received at physical port 113 that is destined for an IPv6 address space, no address conversion is required, and thus the received IPv6 packet is provided to physical network port 111 without any conversion. In turn, the received IPv6 packet is transmitted out via physical port 111.

Alternatively, where it is determined that the received IPv6 packet is destined for an IPv4 address space, an address conversion is needed. In this case, physical network port 113 transfers the received IPv6 packet to virtual port 115. Virtual port 115 receives the IPv6 packet and provides it to IP conversion engine 117. IP conversion engine 117 converts the destination address from the received IPv6 address space to the IPv4 address space. Such a conversion may be done using any conversion process known in the art. As an example such a conversion may be done using a pre-programmed look-up table. As another example, such a conversion may be done using a conversion algorithm. Based upon the disclosure provided herein, one of ordinary skill in the art will recognize a variety of approaches that may be used to perform the conversion.

In addition, IP conversion engine 117 reformats the IPv6 packet header to emulate an IPv4 packet header. This includes replacing the IPv6 destination address in the header with the converted IPv4 address yielded from the previously discussed conversion process. The following pseudocode represents the processes of receiving an IPv6 packet and outputting a corresponding IPv4 packet where internal is physical network port 111, wan is physical network port 113, and root.naf is virtual port 115.

```
IPv6_rev( ):
    T6->S6 RX @wan             /* receive IPv6 packet at port 113
    T6->S6 TX @root.naf        /* transfer received IPv6 packet to
    virtual port 115
IPv4_rev( ):
    V46->A4 RX @root.naf       /* receive converted IPv4 packet
    (former IPv6 packet) at virtual port 115
    V46->A4 TX@ internal       /* transmit converted IPv4 packet
    via port 113
```

Figure 1C:
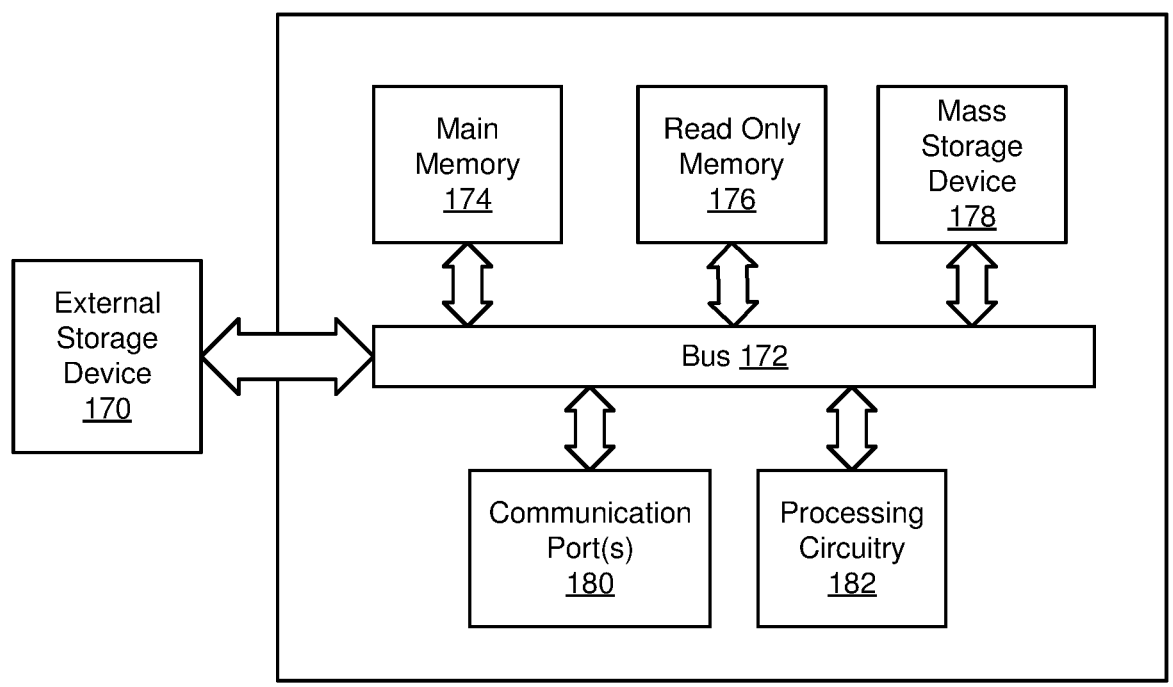

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of endpoint device 101, IP format conversion enabled network appliance 105, and/or endpoint device 103.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
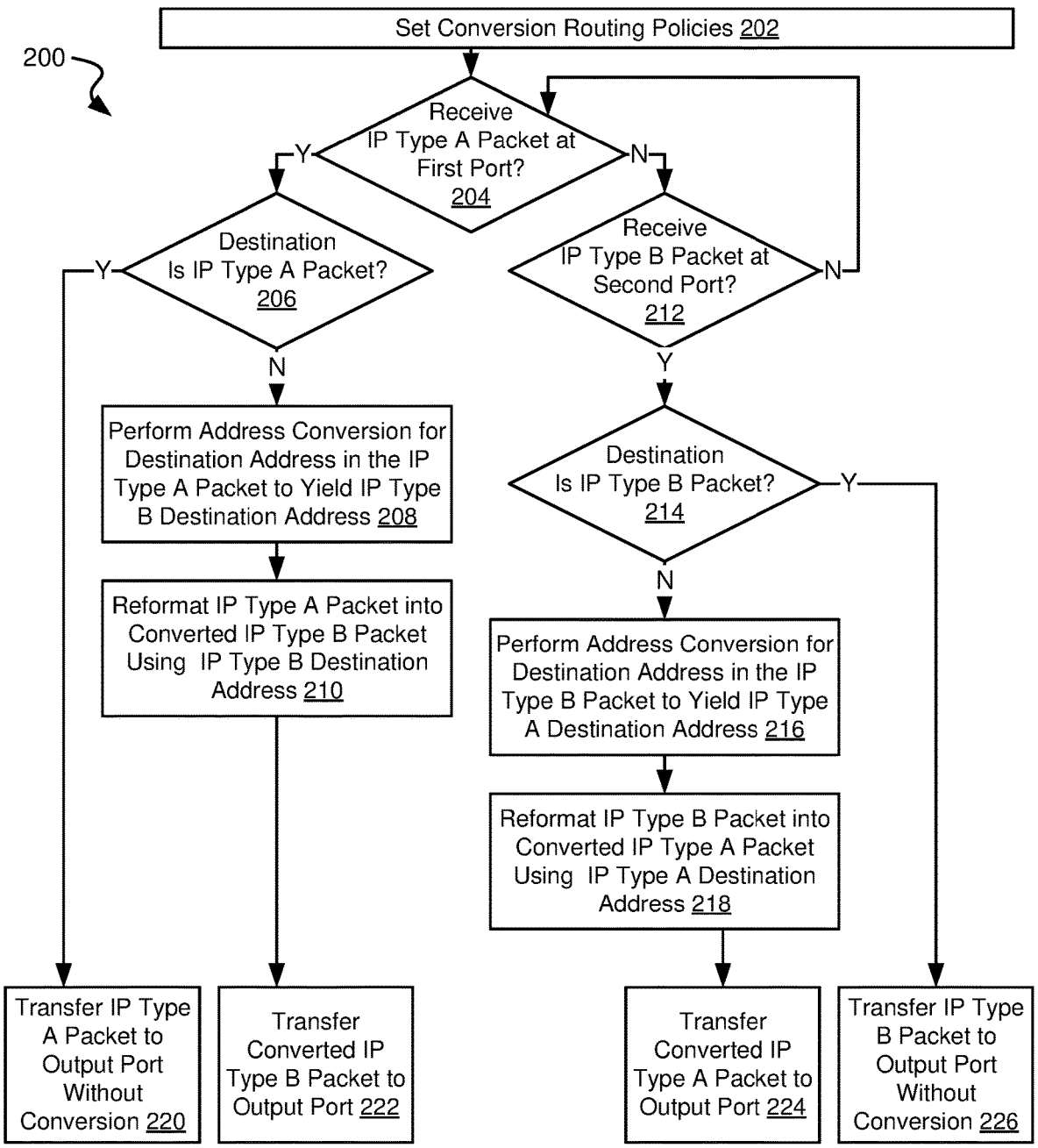
FIG. 2 is a flow diagram showing a method in accordance with various embodiments for IP format conversion.

Turning to FIG. 2, a flow diagram 200 shows a method in accordance with various embodiments for IP format conversion. Following flow diagram 200, various conversion and/or routing policies are set by an operator (block 202).

Figure 3:
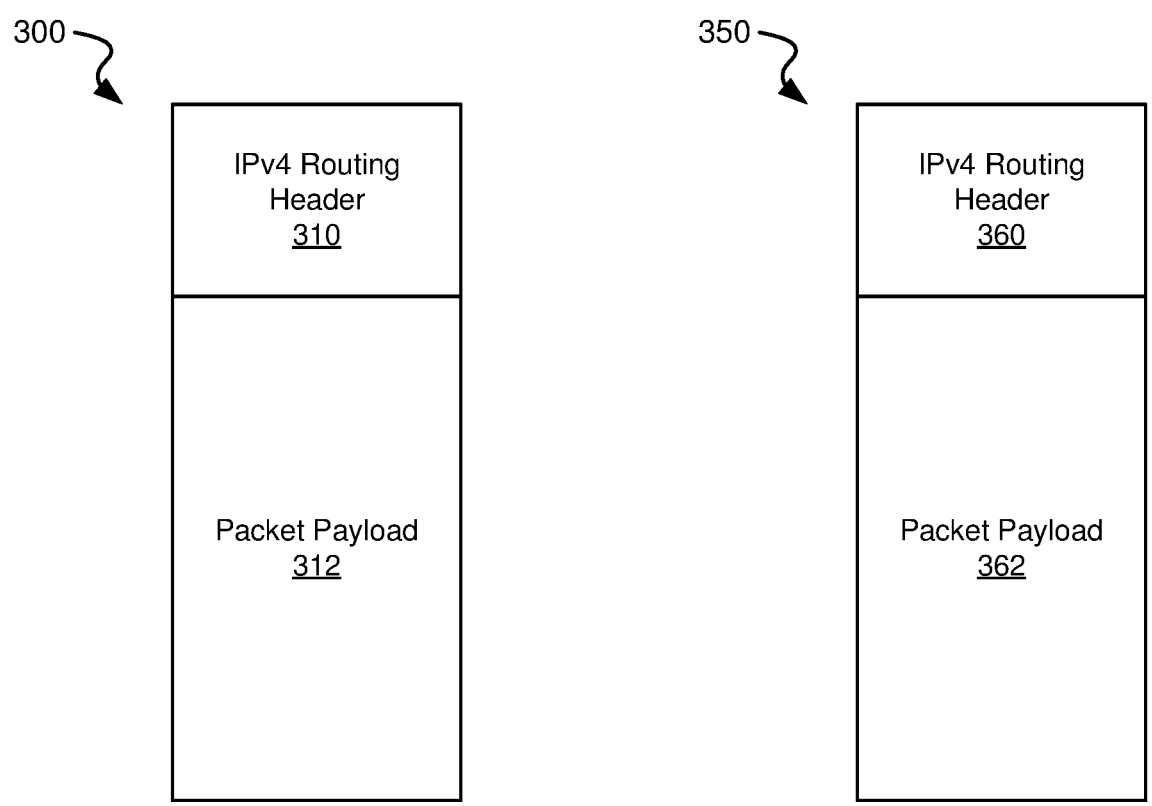
FIG. 3 shows a first IP packet type and a second IP packet type that may be processed using systems and methods discussed herein.

Such conversion and/or routing policies define, for example, which physical ports are designated for receiving/sending IP type A packets, which physical ports are designated for receiving/sending IP type B packets, and to which interfaces (virtual or physical) received packets are to be forwarded depending upon their status as IP type A packets or IP type B packets. In some embodiments, the IP type A packets are IPv4 packets and IP type B packets are IPv6 packets. In one such embodiment, the aforementioned conversion and/or routing policies include the following:

(A) Policies
   (1) Allow any packet received/sent via a first physical port; and
   (2) Allow any packet received/sent via a second physical port
(B) Routing Rules
   (1) Route any IPv4 packet with a destination address that is an IPv6 destination to an virtual conversion port; and process. Turning to FIG. 3 which illustrates packets where the IP type A packets are IPv4 packets and IP type B packets are IPv6 packets, an IP type A packet 300 is shown that includes an IPv4 routing header 310 and a packet payload 312, and an IP type B packet 350 is shown that includes an IPv6 routing header 360 and a packet payload 362. In the case of block 208 and block 210 of FIG. 2, the IPv4 address in IPv4 routing header 310 is converted to an IPv6 address, and the IPv4 routing header 310 is modified to be like IPv6 routing header. The newly formatted routing header is attached to packet payload 312. Returning to FIG. 2, the converted IP packet is transferred to a physical port where it is provided as an output (block 222).

The following pseudocode represents the processes of block 208, block 210, and block 222 where the IP type A packet is an IPv4 packet and the IP type B packet is an IPv6 packet; internal is the first physical port, wan is the second physical port, and root.naf is the virtual conversion port.

```
IPv4_rev( ):
    A4->V46 RX @ internal    /* receive IPv4 packet at the first physical port
    A4->V46 TX @root.naf     /* transfer received IPv4 packet to virtual conversion port
IPv6_rev( ):
    S6->T6 RX @root.naf      /* receive converted IPv6 packet (former IPv4 packet) at
                                the virtual conversion port
    S6->T6 TX @wan           /* transmit converted IPv6 packet via the second physical
                                port
```

(2) Route any IPv6 packet with a destination address that is an IPv4 destination to the virtual conversion port.

The aforementioned conversion and/or routing policies are used to determine which received packets are transferred to a virtual conversion port, and after conversion on to a physical port.

It is determined whether an IP type A packet has been received at the first physical port (block 204). Where an IP type A packet is received at the first physical port (block 204), it is determined whether the destination address of the IP type A packet is for a type A destination (block 206). Thus, as an example, where IP type A is IPv4, it is determined whether a received IPv4 packet includes a destination address that is configured as an IPv4 destination.

Where the destination address of the IP type A packet is a IP type A destination (block 206), the received IP type A packet is transferred to a physical port where it is provided as an output without any conversion (block 220). Alternatively, where the destination address of the IP type A packet is a IP type B destination (block 206), the received IP type A packet is routed to the virtual conversion port. The virtual conversion port receives the IP type A packet and converts the destination address from the IP type A address space to the IP type B address space (block 208). In embodiments where the IP type A packets are IPv4 packets and IP type B packets are IPv6 packets, the conversion is from an IPv4 address space to an IPv6 address space. Such a conversion may be done using any conversion process known in the art. As an example such a conversion may be done using a pre-programmed look-up table. As another example, such a conversion may be done using a conversion algorithm. Based upon the disclosure provided herein, one of ordinary skill in the art will recognize a variety of approaches that may be used to perform the conversion.

The header of the IP type A packet is reformatted as an IP type B packet (block 210). This includes replacing the IP type A address in the header with the converted IP type B address yielded from the previously discussed conversion Alternatively, where an IP type A packet is not received at the first physical port (block 204), it is determined whether an IP type B packets is received at the second physical port (block 212). Where an IP type B packet is received at the second physical port (block 212), it is determined whether the destination address of the IP type B packet is for a type B destination (block 214). Thus, as an example, where IP type B is IPv6, it is determined whether a received IPv6 packet includes a destination address that is configured as an IPv6 destination.

Where the destination address of the IP type B packet is a IP type B destination (block 214), the received IP type B packet is transferred to a physical port where it is provided as an output without any conversion (block 226). Alternatively, where the destination address of the IP type B packet is a IP type A destination (block 214), the received IP type B packet is routed to the virtual conversion port. The virtual conversion port receives the IP type B packet and converts the destination address from the IP type B address space to the IP type A address space (block 216). In embodiments where the IP type A packets are IPv4 packets and IP type B packets are IPv6 packets, the conversion is from an IPv6 address space to an IPv4 address space. Such a conversion may be done using any conversion process known in the art. As an example such a conversion may be done using a pre-programmed look-up table. As another example, such a conversion may be done using a conversion algorithm. Based upon the disclosure provided herein, one of ordinary skill in the art will recognize a variety of approaches that may be used to perform the conversion.

The header of the IP type B packet is reformatted as an IP type A packet (block 218). This includes replacing the IP type B address in the header with the converted IP type A address yielded from the previously discussed conversion process. Referring to FIG. 3 in the case of block 216 and block 218 of FIG. 2, the IPv6 address in IPv6 routing header 360 is converted to an IPv4 address, and the IPv6 routing header 360 is modified to be like IPv4 routing header 310.

The newly formatted routing header is attached to packet payload 362. Returning to FIG. 2, the converted IP packet is transferred to a physical port where it is provided as an output (block 224).

The following pseudocode represents the processes of block 216, block 218, and block 224 where the IP type A packet is an IPv4 packet and the IP type B packet is an IPv6 packet; internal is the first physical port, wan is the second physical port, and root.naf is the virtual conversion port.

```
IPv6_rev( ):
    T6->S6 RX @wan         /* receive IPv6 packet at the second physical port
    T6->S6 TX @root.naf    /* transfer received IPv6 packet to virtual conversion port
IPv4_rev( ):
    V46->A4 RX @root.naf   /* receive converted IPv4 packet (former IPv6 packet) at
the virtual conversion port
    V46->A4 TX@ internal   /* transmit converted IPv4 packet via the first physical port
```

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for supporting multiple Internet Protocol (IP) types, the method comprising:
   receiving, at a first physical port of a network appliance, an IP type A packet, wherein the IP type A packet includes a packet header and a packet payload;
   determining, by one or more processing resources of the network appliance, whether the IP type A packet is destined for an IP type A address space or an IP type B address space to determine whether the IP type A packet needs address conversion;
   transferring the IP type A packet to a second physical port of the network appliance when the IP type A packet is destined for an IP type A address space without any address conversion;
   routing, by the one or more processing resources, the IP type A packet to a virtual port when the IP type A packet is destined for an IP type B address space;
   receiving, the IP type A packet by the virtual port;
   based at least in part on being received by the virtual port, converting the IP type A address to an IP type B address by the one or more processing resources; and
   reformatting the IP type A packet received by the virtual port including an IP type A header being reformatted into an IP type B header with the IP type B address and attaching the reformatted IP type B header to the packet payload from the IP type A packet, wherein the IP type B header includes the IP type B address, wherein the first physical port, the second physical port, the virtual port, and the one or more processing resources are part of the same network appliance.

2. The method of claim 1, wherein the method further comprises: routing, by the one or more processing resources, the IP type B packet to the second physical port.

3. The method of claim 2, wherein the virtual port is capable of receiving the IP type A packet having the IP type A address that is converting to an IP type B address and the virtual port is capable of receiving an IP type B packet having an IP type B address that is converting to an IP type A address.

4. The method of claim 3, wherein the network appliance is a network firewall.

5. The method of claim 1, wherein the IP type A packet is selected from a group consisting of: an IPv4 packet, and an IPv6 packet.

6. The method of claim 4, wherein the IP type B packet is selected from a group consisting of: the IPv4 packet, and the IPv6 packet.

7. The method of claim 1, wherein the first physical port is an Ethernet port.

8. A system for processing Internet Protocol (IP) packets, the system comprising:
   a first physical port, and a second physical port;
   one or more processing resources;
   a non-transitory computer-readable medium, coupled to the one or more processing resources, having stored therein instructions that when executed by the one or more processing resources cause the one or more processing resources to:
   provision a virtual port to convert IP packets;
   receive an IP type A packet at the first physical port, wherein the IP type A packet includes a packet header and a packet payload;
   determine whether the IP type A packet is destined for an IP type A address space or an IP type B address space to determine whether the IP type A packet needs address conversion;
   transferring the IP type A packet to the second physical port when the IP type A packet is destined for an IP type A address space without any address conversion;
   route the IP type A packet to the virtual port when the IP type A packet is destined for an IP type B address space;
   receive the IP type A packet by the virtual port;
   based at least in part on being received by the virtual port, convert the IP type A address to an IP type B address by the one or more processing resources; and
   reformat the IP type A packet received by the virtual port including an IP type A header being reformatted into an IP type B header with the IP type B address and attaching the reformatted IP type B header to the packet payload from the IP type A packet, wherein the IP type B header includes the IP type B address, wherein the first physical port, the second physical port, the virtual port, and the one or more processing resources are part of the same system, which is a network appliance.

9. The system of claim 8, wherein the instructions that when executed by the one or more processing resources further cause the one or more processing resources to:
   route the IP type B packet to the second physical port.

10. The system of claim 8, wherein the virtual port is capable of receiving the IP type A packet having the IP type A address that is converting to an IP type B address and the virtual port is capable of receiving an IP type B packet having an IP type B address that is converting to an IP type A address.

11. The system of claim 10, wherein the network appliance is a network firewall.

12. The system of claim 8, wherein the IP type A packet is selected from a group consisting of: an IPv4 packet, and an IPv6 packet.

13. The system of claim 12, wherein the IP type B packet is selected from a group consisting of: the IPv4 packet, and the IPv6 packet.

14. The system of claim 8, wherein the first physical port is an Ethernet port.

15. A non-transitory computer-readable storage medium embodying a set of instructions, which when executed by one or more processing resources of a network appliance, causes the one or more processing resources to:
provision a virtual port to convert IP packets;
receive an IP type A packet at a first physical port of the network appliance, wherein the IP type A packet includes a packet header and a packet payload;
determine whether the IP type A packet is destined for an IP type A address space or an IP type B address space to determine whether the IP type A packet needs address conversion;
transferring the IP type A packet to a second physical port of the network appliance when the IP type A packet is destined for an IP type A address space without any address conversion;
route the IP type A packet to the virtual port when the IP type A packet is destined for an IP type B address space;
receive the IP type A packet by the virtual port;
based at least in part on being received by the virtual port, convert the IP type A address to an IP type B address by the one or more processing resources; and
reformat the IP type A packet received by the virtual port including an IP type A header being reformatted into an IP type B header with the IP type B address and attaching the reformatted IP type B header to the packet payload from the IP type A packet,
wherein the IP type B header includes the IP type B address, wherein the first physical port, the second physical port, the virtual port, and the one or more processing resources are part of the same network appliance.

16. The non-transitory computer-readable storage medium of claim 15,
wherein the instructions that when executed by the one or more processing resources further cause the one or more processing resources to:
route the IP type B packet to a second physical port, wherein the virtual port is capable of receiving the IP type A packet having the IP type A address that is converting to an IP type B address and the virtual port is capable of receiving an IP type B packet having an IP type B address that is converting to an IP type A address.

17. The non-transitory computer-readable storage medium of claim 16, wherein the second physical port is an Ethernet port.

18. The non-transitory computer-readable storage medium of claim 15, wherein the IP type A packet is selected from a group consisting of: an IPv4 packet, and an IPv6 packet.

19. The non-transitory computer-readable storage medium of claim 18, wherein the IP type B packet is selected from a group consisting of: the IPv4 packet, and the IPv6 packet.

20. The non-transitory computer-readable storage medium of claim 15, wherein the first physical port is an Ethernet port.

* * * * *